(12) United States Patent
Clemen

(10) Patent No.: US 12,007,118 B2
(45) Date of Patent: Jun. 11, 2024

(54) PILOT ARRANGEMENT, NOZZLE DEVICE, METHOD AND GAS TURBINE ARRANGEMENT

(71) Applicant: Rolls-Royce Deutschland Ltd & Co KG, Blankenfelde-Mahlow (DE)

(72) Inventor: Carsten Clemen, Mittenwalde (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/356,416

(22) Filed: Jul. 21, 2023

(65) Prior Publication Data

US 2024/0053014 A1 Feb. 15, 2024

(30) Foreign Application Priority Data

Aug. 10, 2022 (DE) ...................... 10 2022 208 337.7

(51) Int. Cl.
*F23R 3/34* (2006.01)
*F23R 3/28* (2006.01)
(Continued)

(52) U.S. Cl.
CPC .............. *F23R 3/343* (2013.01); *F23R 3/283* (2013.01); *B33Y 10/00* (2014.12); *B33Y 80/00* (2014.12); *F23R 2900/00018* (2013.01)

(58) Field of Classification Search
CPC .......... F23R 3/283; F23R 3/343; B33Y 10/00; B33Y 80/00
See application file for complete search history.

(56) References Cited

U.S. PATENT DOCUMENTS 5,647,538 A * 7/1997 Richardson ........... F23D 11/107
239/419
5,680,766 A 10/1997 Joshi et al.
(Continued)

FOREIGN PATENT DOCUMENTS

DE 102018204741 A1 10/2019
DE 112017001738 B4 5/2022
(Continued)

OTHER PUBLICATIONS

German Search Report dated Apr. 11, 2023 from counterpart German Patent Application No. 10 2022 208 337.7.

*Primary Examiner* — Lorne E Meade
(74) *Attorney, Agent, or Firm* — SHUTTLEWORTH & INGERSOLL, PLC; Timothy J. Klima

(57) ABSTRACT

A pilot arrangement for a nozzle of a gas turbine, includes a cavity extending along a longitudinal axis for conducting fuel, the narrowest flow cross section of which is larger than a flow cross section of a pilot fuel nozzle, and the pilot fuel nozzle, which adjoins the cavity downstream and includes a pilot line and a pilot fuel outlet arranged downstream of the pilot line, the narrowest flow cross section of which is smaller than that of the cavity. A compact configuration is achieved in that the cavity is arranged in a central body arranged on the longitudinal axis, a swirling element is arranged in a circumferential manner around the central body, wherein the central body and the swirling element form a swirling arrangement, and the swirling element, the central body and the pilot fuel nozzle are configured as a continuous, integral component.

15 Claims, 6 Drawing Sheets

Figure 1C:
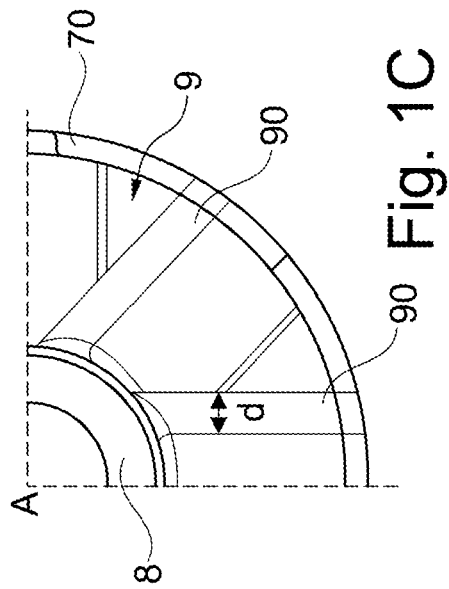

(51) Int. Cl.
    *B33Y 10/00*        (2015.01)
    *B33Y 80/00*        (2015.01)

(56)            References Cited

U.S. PATENT DOCUMENTS 10,072,845  B2    9/2018   Mook et al.
10,082,294  B2    9/2018   Laster et al.
11,371,708  B2    6/2022   Thariyan et al.
2009/0255256 A1* 10/2009  Mcmasters ............. F23R 3/286
                                                60/734
2014/0291418 A1  10/2014   Ruffing et al.
2015/0253011 A1*  9/2015   Uhm ....................... F23C 7/004
                                                60/776

FOREIGN PATENT DOCUMENTS

EP        1445540  A1    8/2004
EP        2196733  A1    6/2010
EP        2362148  A1    8/2011
EP        3978806  A1    4/2022

* cited by examiner (State of the Art)

(State of the Art)

(State of the Art)

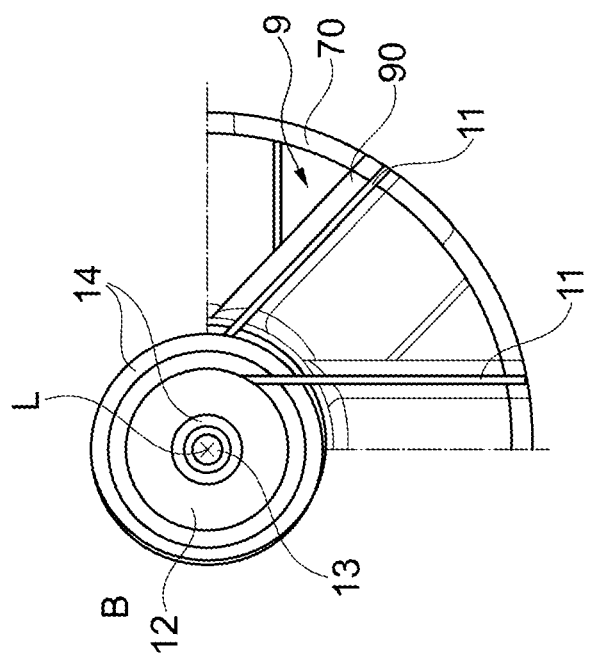
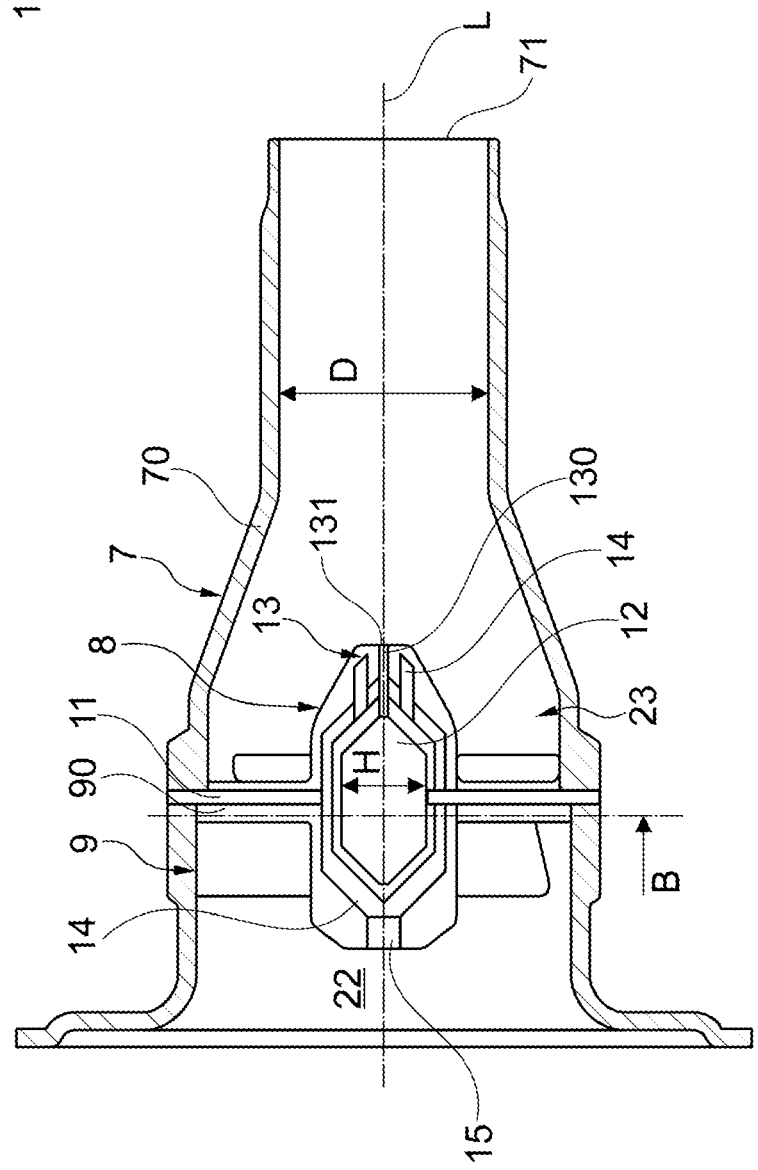
Fig. 2B
Fig. 2A

PILOT ARRANGEMENT, NOZZLE DEVICE, METHOD AND GAS TURBINE ARRANGEMENT

This application claims priority to German Patent Application 102022208337.7 filed Aug. 10, 2022, the entirety of which is incorporated by reference herein.

The invention relates to a pilot arrangement for use in a nozzle device of a gas turbine arrangement, in particular of an aircraft engine, according to the present disclosure. Furthermore, the invention relates to a nozzle device, a production method and a gas turbine arrangement.

Fuel nozzles frequently have a pilot stage (pilot means) so as to carry out combustion processes in a stable manner in an aircraft engine over as wide an operating range as possible. In this case, less fuel is supplied via the pilot means than via a main stage. The combustion process via the pilot stage is operated in a stable range, thus stabilizing the combustion process via the main stage.

A pilot arrangement of the type mentioned at the outset is specified in U.S. Pat. No. 10,072,845 B2. In this document, the dimensions of the nozzle device comprising the pilot arrangement are relatively large.

A further pilot arrangement, in a nozzle device which likewise has relatively large dimensions, is specified in EP 1 445 540 A1.

US 2014/0291418 A1 shows a nozzle device comprising two air channels for operating with two air flows (two-flow fuel nozzle), without a pilot means.

The object of the present invention is to provide a pilot arrangement, with which even compact nozzle devices can be operated in a safe and stable manner, and also a nozzle device comprising the pilot arrangement, a method for producing the pilot arrangement and a gas turbine arrangement.

The object is achieved with respect to the pilot arrangement by the features of the present disclosure. The object is achieved with regard to the nozzle device, with regard to the method and with regard to the gas turbine arrangement by features of the present disclosure.

In the pilot arrangement, it is provided that the cavity is arranged in a central body arranged on the longitudinal axis, that at least one swirling element is arranged in a circumferential manner around the central body, wherein the central body and the at least one swirling element form a swirling arrangement, and that the at least one swirling element, the central body and the pilot fuel nozzle are configured as a continuous, integral component.

The integral component obtained thus has a dual function, wherein the pilot arrangement is integrated into the swirling arrangement or is configured as a swirling arrangement. In this way, a pilot arrangement configuration which is optimized in respect of installation space is advantageously achieved.

The cavity acts in particular as a settling chamber for pilot fuel supplied from pilot fuel supply line(s).

The pilot line can have a constant flow cross section over the axial length.

Further contributing to a compact configuration of the pilot arrangement is the provision of at least one pilot fuel supply line for supplying fuel into the cavity, wherein the at least one pilot fuel supply line is guided through the at least one swirling element, for conducting pilot fuel from a circumferential wall of an inner air channel radially inwards into the cavity. Where a plurality of swirling elements is provided, a plurality of pilot fuel supply lines is preferably provided, wherein preferably a plurality and/or each of the swirling elements has at least one pilot fuel supply line.

For thermal shielding of the cavity and/or the pilot line, a hollow chamber is arranged as a heat shield, preferably in a circumferential manner around the pilot fuel nozzle, in particular around the pilot line, and/or the cavity. The hollow chamber is preferably fluidically connected, i.e. a single continuous hollow chamber is provided. The hollow chamber is configured around the pilot line, for example as a gap-like chamber which is, at least in portions, fully circumferential. Around the cavity, the hollow chamber is preferably configured so as to be complementary to the shape of the cavity, wherein a wall provided between the cavity and the hollow chamber can, for example, have an at least substantially constant thickness. Fuel-carrying fluid ducts (for example the pilot fuel supply line(s) and/or the pilot line) passing through the hollow chamber into or out of the cavity are configured to be fluid-tight relative to the hollow chamber.

In this case, it can advantageously be provided that the hollow chamber is sealed in a flow-tight manner relative to the environment (an air atmosphere surrounding the pilot arrangement). In this way, no exchange of substances, in particular no gas exchange, can occur between the hollow chamber and the environment.

Particularly effective thermal shielding is achieved if the hollow chamber is filled with an inert gas (for example argon or xenon) or evacuated (i.e. subjected to a vacuum). The inert gas takes the form in particular of a gas with a lower thermal conductivity than air (which has a thermal conductivity of 0.0262 W/mK). It is thus possible to prevent disadvantageous coking of fuel within the cavity and/or pilot line.

The pilot means can be advantageously relocated into the region of the outlet of the inner air channel if, at the downstream end of the central body, a lance is provided which extends on the longitudinal axis and in which the pilot line extends at least for the most part, wherein the lance comprising the pilot line has an axial length such that the fuel outlet is positioned at least in a downstream third or quarter, preferably at least substantially at an outlet, of an inner air channel of the nozzle device.

Advantageous manufacturing options are achieved if the flow cross section(s) of the pilot line and/or the at least one pilot fuel supply line(s) is/are configured to be round and/or rhombic.

Furthermore, advantageous manufacturing options are achieved if all walls of the pilot arrangement and/or the integral component comprising the pilot line are aligned at an angle of no more than 45° to the longitudinal axis. In this case, the additive manufacturing method can be applied in such a way that the longitudinal axis is aligned in a perpendicular manner on a base plate of a suitable printing device. The integral component is preferably constructed from the upstream end towards the pilot fuel outlet as the downstream end.

In a configuration variant which is favourable in respect of the atomisation properties of the pilot arrangement, an atomizing means, in particular a central body comprising support structures, is arranged within the fuel nozzle, in particular in the pilot line. The central body is positioned in particular with the downstream end thereof level with the pilot fuel outlet. Preferably, the atomizing means is manufactured together with the pilot arrangement as an integral component. In this case, the walls of the atomizing means are also at an angle of no more than 45° to the longitudinal axis.

The nozzle device according to the invention comprises a pilot arrangement according to any one of the configuration variants specified above and an inner air channel, which is arranged on a central longitudinal axis of the nozzle device and within which the pilot arrangement is arranged coaxially with the inner air channel, i.e. the longitudinal axis lies on the central longitudinal axis.

To achieve relatively low pressure loss, the central body and the swirling element(s) are preferably arranged upstream of the narrowest flow cross section of the inner air channel.

Optionally, the inner air channel, comprising a (for example cylindrical) wall enclosing the inner air channel, can form, at least in part, a portion of the integral component which comprises and/or forms the pilot arrangement.

In the method for producing the pilot arrangement configured according to any one of the configuration variants specified above, it is provided that the pilot arrangement is manufactured as an integral component comprising at least one, preferably a plurality of, swirling element(s), the central body and the pilot fuel nozzle by means of an additive manufacturing process (3D printing).

The pilot fuel nozzle is arranged in the central body and/or at least in part within the lance. Where the lance is provided, the lance is preferably manufactured together with the integral component and is thus an integral part thereof.

In the additive manufacturing method, an opening to the hollow chamber is preferably incorporated. The opening is preferably subsequently closed, for example by means of welding, in a controlled atmosphere (inert gas or vacuum).

The pilot fuel supply line(s) can be manufactured to the final size thereof (the final flow cross section thereof) during the 3D-printing process. Alternatively, the pilot fuel supply line(s) can be drilled to the final size in a subsequent method step.

Figure 1B:
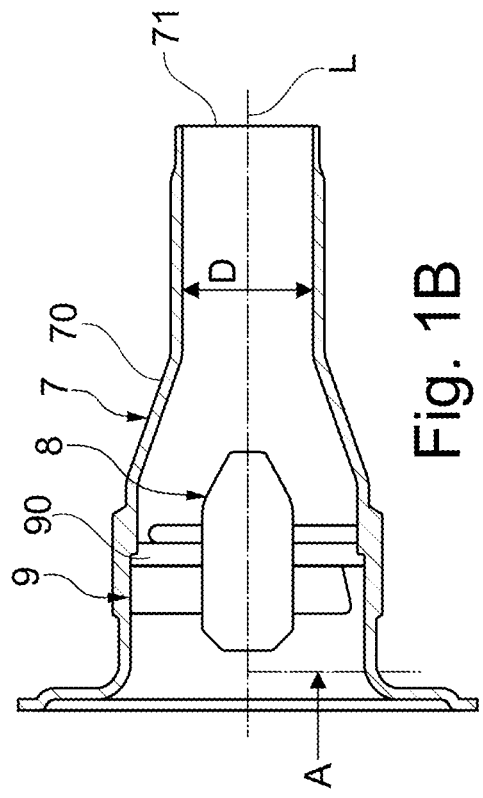
Figure 1A:
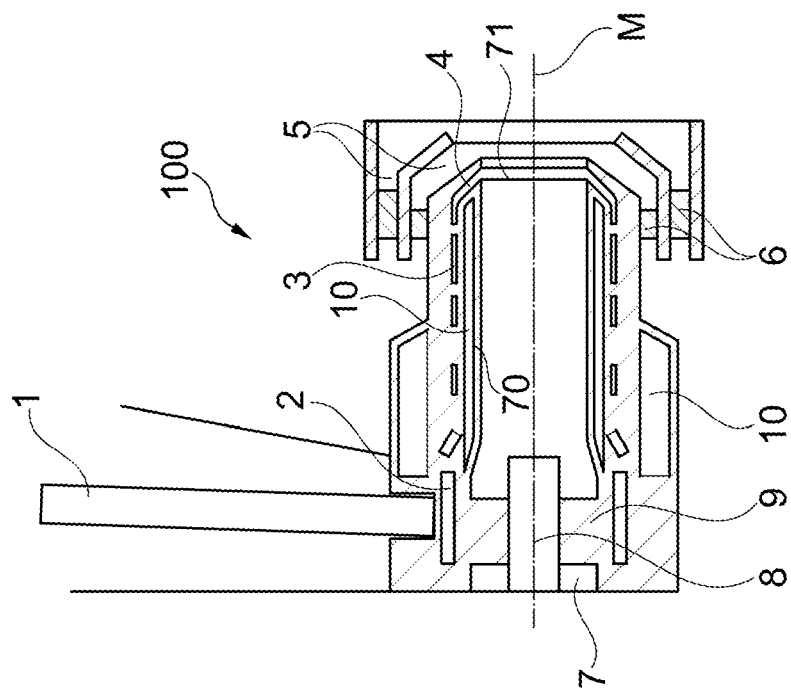
Figure 3:
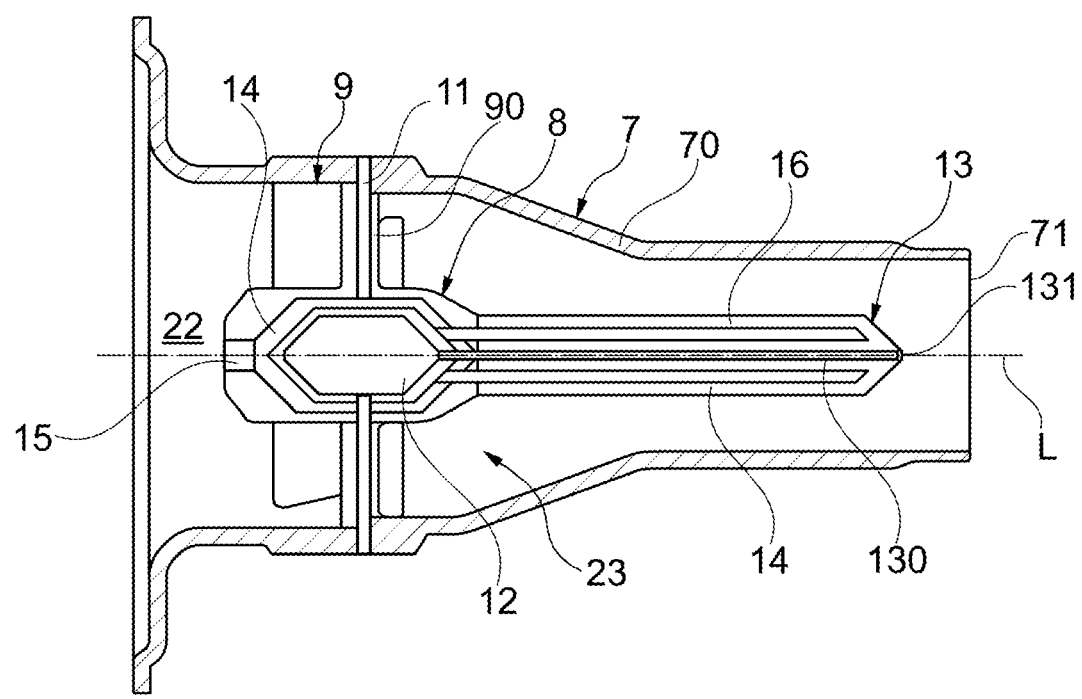
Figure 4A:
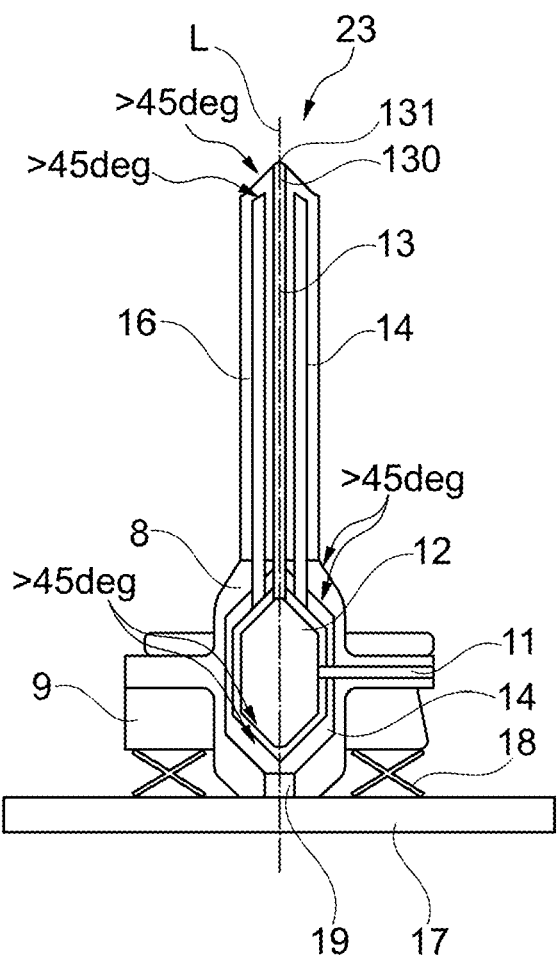
Figure 4B:
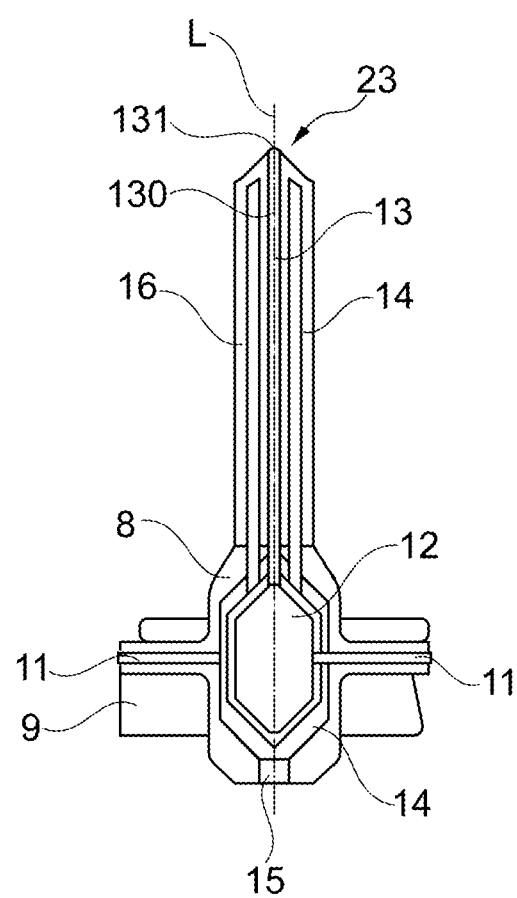
Figure 5:
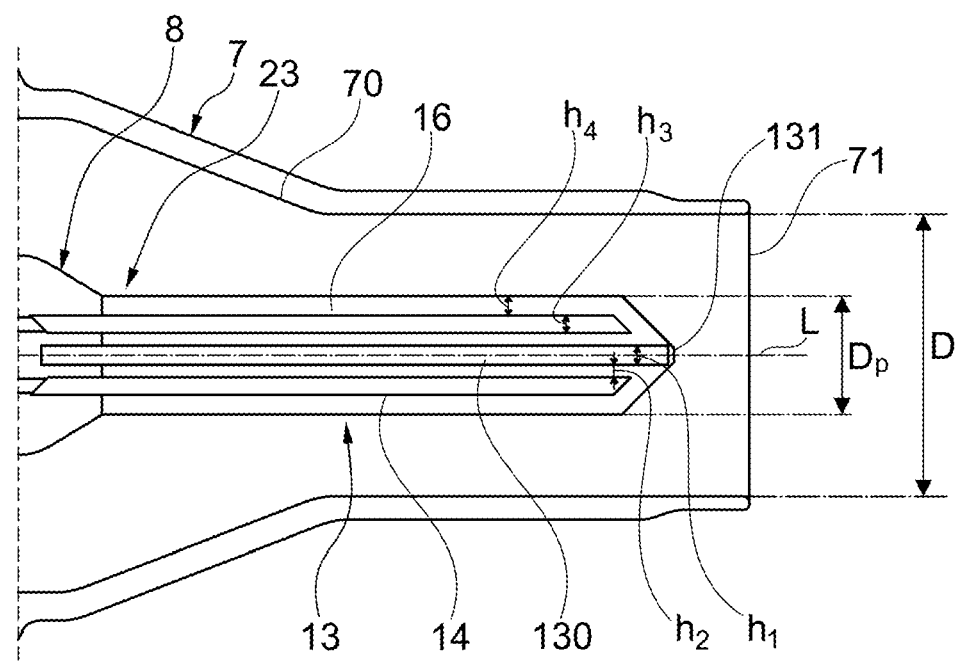
Figure 6:
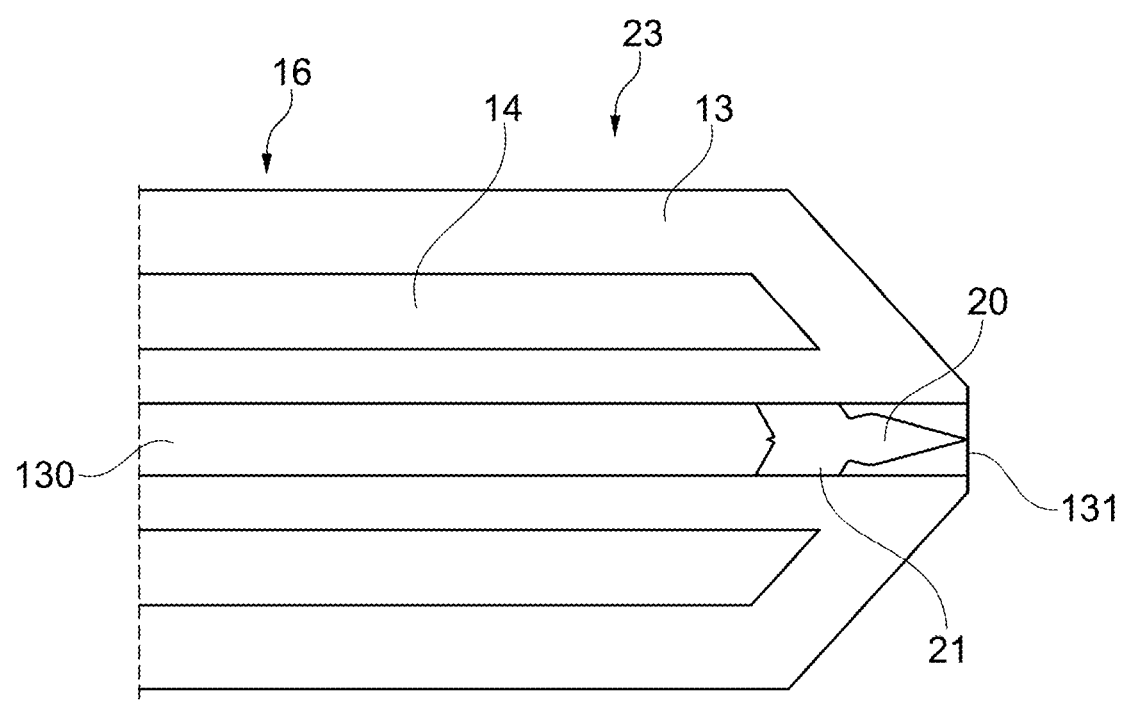

The invention is explained in greater detail below on the basis of exemplary embodiments with reference to the drawings, in which:

FIGS. 1A, 1B, 1C show a longitudinal sectional view of a nozzle device comprising a swirling arrangement according to the prior art (FIG. 1A), a longitudinal sectional view of an inner air channel of the nozzle device (FIG. 1B) and a partial sectional view of the swirling arrangement along a line A of intersection (FIG. 1C), FIGS. 2A, 2B show a longitudinal sectional view of the inner air channel of a nozzle device according to the invention comprising a pilot arrangement (FIG. 2A) and a partial sectional view of the pilot arrangement along a line B of intersection (FIG. 2B), FIG. 3 shows a longitudinal sectional view of the inner air channel of a nozzle device according to the invention comprising a further configuration variant of the pilot arrangement, FIG. 4A, 4B show a longitudinal sectional view of the pilot arrangement according to FIG. 3 during the production process, FIG. 5 shows a longitudinal sectional view of a portion of the inner air channel according to FIG. 3 to illustrate example dimensions, and FIG. 6 shows a longitudinal sectional view of a portion of a pilot line of the pilot arrangement comprising a central body.

FIG. 1A shows a longitudinal sectional view of a nozzle device 100 comprising three air channels 5, 7 (three flow fuel nozzle), as known from the prior art. Nozzle devices 100 of this type are used in particular in aircraft engines. FIG. 1B shows a longitudinal sectional view of an inner air channel 7 of the nozzle device 100, with an integrated central body 8. FIG. 1C shows a partial sectional view of the inner air channel 7 along the line A of intersection.

The nozzle device 100 shown in FIGS. 1A to 1C is configured in particular for operating with a liquid fuel (kerosene-based or kerosene-related).

The nozzle device 100 has a fuel feed 1 which is connected in terms of flow for providing fuel during operation to an annular fuel reservoir 2 of the nozzle device 100. Arranged downstream of the annular fuel reservoir 2 is an annular fuel line 3, which provides fuel to a fuel injector 4 of the nozzle device 100 during operation. The fuel is injected into a combustion chamber (not shown in this case) by means of the fuel injector 4.

The fuel injector 4 is radially surrounded by two circumferential air channels 5, a radially outer air channel and a radially central air channel. Swirling elements 6 are arranged within each of the air channels 5.

In a central position on a longitudinal axis L, the nozzle device 100 comprises the inner air channel 7 which is enclosed by a wall 70, in particular a cylindrical wall. The inner air channel 7, at the downstream end thereof, has an outlet 71 for adjoining the combustion chamber. An internal diameter D in a downstream portion and/or at the outlet 71 can be 7 mm to 15 mm for example.

Provided between the inner air channel 7 and the annular fuel line 3 and/or the fuel injector 4 is an air chamber 10 for thermally shielding (i.e. acting as a heat shield) these fuel-carrying lines.

Arranged within the inner air channel 7 is a swirling arrangement 9, which has a central body 8 in a central position on the longitudinal axis L. Swirling elements 90 of the swirling arrangement 9 are arranged around the central body 8 for generating a swirl flow within the inner air channel 7 during operation and extend from the central body 8 in a radial-tangential direction to the wall 70. An example thickness d of the swirling elements 90 is 0.8 mm to 1.5 mm. The swirling elements 90 and the central body 8 are manufactured as separate components which are joined to one another prior to installation, for example during assembly of the nozzle device 100.

Stability problems can arise during operation using the nozzle device 100 according to FIGS. 1A to 1C, wherein for example, a lean blowout can occur. A pilot means can be used for stabilisation purposes, but this is difficult to implement, however, in particular in small nozzle devices 100 due to a lack of installation space.

A pilot arrangement 23 is shown in FIG. 2A in a longitudinal sectional view of the inner air channel 7, and in FIG. 2B in a partial sectional view along the line B of intersection. This pilot arrangement can be constructed in a compact manner, and therefore can be fitted simply in small nozzle devices 100, as shown for example in FIG. 1A.

The pilot arrangement 23 has a cavity 12 which is arranged centrally on the longitudinal axis L and extends along the longitudinal axis L. The narrowest flow cross section of the cavity 12 is configured to be larger than the flow cross section of the pilot fuel nozzle 13, in particular the pilot line 130. For example, a maximum height H of the cavity (for example a diameter) corresponds for example to ¼ to ¾ of the diameter D of the inner air channel 7. The cavity 12 acts in particular as a settling chamber for the fuel flow.

Furthermore, the pilot arrangement 23 has a pilot fuel nozzle 13 comprising a pilot line 130, which extends in an axial manner centrally on the longitudinal axis L, and a fuel outlet 131, which is arranged at the downstream end of the pilot line 130. The pilot fuel nozzle 13 is arranged directly downstream of and is connected in terms of flow to the cavity 12 and is fed with fuel from the cavity 12 during operation.

The pilot arrangement 23 according to the invention is integrated into the swirling arrangement 9 for a particularly compact construction. In this case, the cavity 12 is arranged in the central body 8 of the swirling arrangement 9, in particular symmetrically relative to the longitudinal axis L. The swirling elements 90 are arranged radially in a circumferential manner around the central body 8 comprising the cavity 12. The pilot fuel nozzle 13 can also be arranged in the central body 8 and/or in a lance 16 which is arranged at the downstream end of the central body 8 and extends centrally on the longitudinal axis L (cf. for example FIG. 3).

For a compact, fluid-tight configuration, the pilot arrangement 23 is configured with the swirling elements 90 and the central body 8 comprising the cavity 12 as a continuous, integral component.

The pilot arrangement 23 moreover comprises, by way of example, a plurality of pilot fuel supply lines 11 for supplying fuel into the cavity 12. For a particularly compact design, the pilot fuel supply lines 11 are guided through the swirling elements 90 from the radially exterior region, i.e. from the wall 70 of the inner air channel 7, inwards to the cavity 12. For this purpose, a corresponding distribution line for providing the pilot fuel supply lines 11 with fuel (not shown in this case) is preferably arranged in the wall 70.

For thermal shielding of the cavity 12 and/or the pilot line 130, a hollow chamber 14 is arranged as a heat shield within the central body 8 in a circumferential, preferably at least substantially fully circumferential, manner around the pilot line 130 and/or the cavity 12. Preferably, precisely one (continuous in terms of flow) hollow chamber 14 is provided. The pilot fuel supply lines 11 are configured to be fluid-tight relative to the hollow chamber 14.

For effective heat shielding, the hollow chamber 14 is sealed in a flow-tight manner, for example by means of a weld 15, relative to an environment 22, i.e. an air atmosphere surrounding the pilot arrangement 23, and is particularly advantageously filled with an inert gas or evacuated. The inert gas can take the form in particular of a gas with a lower thermal conductivity than air, for example argon (thermal conductivity 0.0179 W/mK) or xenon (thermal conductivity: 0.0055 W/mK). An optimized heat shield effect is achieved by the inert gas or vacuum, thereby effectively minimizing heat input from the inner air channel 7 (with air temperatures of approximately 600° C.) to the fuel (approximately 50° C.) within the cavity 12 and/or the pilot line 130, even when the dimensions involved are small. This thus prevents coking within the pilot line 130 and/or the cavity 12, which could cause fuel-carrying lines to become blocked and thus the pilot arrangement 23 to break down.

FIG. 3 shows an exemplary embodiment of the pilot arrangement 23, in which the pilot fuel outlet 131 is arranged in the downstream third of the inner air channel 7 in the vicinity of the outlet 71. For this purpose, a lance 16, which extends coaxially with the inner air channel 7 on the longitudinal axis L, is arranged at the downstream end of the central body 8. At least the majority of the pilot line 130 extends within the lance 16. A portion of the hollow chamber 14, which surrounds the pilot line 130 at least for the most part, is also configured within the lance 16. The lance 16 enables the heat release zone to be located further downstream during the pilot combustion process.

The lance 16 is preferably also manufactured integrally with the central body 8 and the swirling elements 90, i.e. the integral component comprising the pilot arrangement also comprises the lance 16.

The flow cross sections of the pilot line 130 and/or the pilot fuel supply lines 11 are preferably configured to be round and/or rhombic.

As FIG. 4A shows, all walls of the pilot arrangement 23 (in particular the walls of the central body 8, the swirling elements 90 and, where applicable, the lance 16) are aligned at an angle of no more than 45° to the longitudinal axis L. This advantageously allows the pilot arrangement 23 to be manufactured as an integral component by means of an additive manufacturing method, in particular 3D printing.

FIGS. 4A and 4B illustrate the manufacturing method, wherein, in addition to the pilot arrangement 23, FIG. 4A also shows a base plate 17 of a suitable 3D printing device and support structures 18 on the pilot arrangement 23.

In the manufacturing method, the pilot arrangement 23 is manufactured as an integral component comprising the central body 8 and the swirling elements 90 and, where applicable, the lance 16 and optionally the inner air channel 7 (not shown in this case), with the longitudinal axis L aligned perpendicularly to the base plate 17. In this case, the component is built upwards, as shown in FIG. 4A, starting from the base plate 17, from the upstream end of the central body 8 (or, if provided, the inner air channel 7) to the pilot fuel outlet 131 as the upstream end.

An opening 19 is incorporated at the upstream end as a means of access to the hollow chamber 14. The support structures 18 are used as required to produce the swirling elements 90. The internal geometry, comprising the cavity 12, the pilot line 130 and the hollow chamber 14, is likewise manufactured in a fully integral manner. By arranging all walls at an angle of no more than 45° to the longitudinal axis L, the walls or surfaces achieve a sufficient level of quality and accuracy.

During manufacture of the pilot arrangement 23, the pilot fuel supply lines 11 can be drilled to size through the swirling elements 90 in a subsequent step. They can, however, also be printed to size during the 3D printing process, wherein in this case a rhombic cross-section in particular is to be provided.

After completion of the 3D printing process, the support structures 18 are removed.

The hollow chamber 14 is then sealed in a fluid-tight manner, for example by means of welding. The welding process is preferably carried out in a controlled atmosphere consisting of, for example, argon, xenon or a vacuum, the hollow chamber 14 being filled with an inert gas or evacuated accordingly.

FIG. 5 shows, by way of example, typical dimensions at the downstream end of the inner air channel 7 and the lance 16, as are advantageous, for example, for a diameter D of the inner air channel 7 of 8 mm: an external diameter Dp of the lance 16 can be 3 mm for example. A maximum channel height h1 of the pilot line 130, for example a diameter, can be 0.6 mm for example. A maximum thickness h2 of the wall around the pilot line 130 can be 0.4 mm for example. A maximum channel height h3 of the hollow chamber 14 in the region of the pilot line 130 can be 0.4 mm for example. A maximum thickness h4 of the wall around the hollow chamber 14 can be 0.4 mm for example. If the inner air channel 7 and/or the lance 16 have different dimensions, the sizes specified can be scaled in the corresponding ratio for example.

The wall thickness of the central body 8 (not shown in FIG. 5) can be 0.3 to 0.5 mm for example. The clear height of the hollow chamber 14 within the central body 8 is 0.35 mm for example. A maximum height (in particular a diameter) within the pilot fuel supply line(s) 11 is at least 0.4 mm for example. The radial external size (for example diameter) of the central body 8 is, for example, 1.1 to 2.0 times the external diameter Dp of the lance 16 and/or between ¼ and ½ of the diameter of the inner air channel 7 in the region of the central body 8.

Other expedient sizes and/or ratios are also possible.

An optional atomizing means arranged within the pilot line 130 is shown in FIG. 6 in a longitudinal sectional view of a portion of the pilot line 130. The atomizing means has a central body 20 which is arranged on the longitudinal axis L and is supported relative to the walls of the pilot line 130 by means of radially extending support structures 21, for example three support structures. The atomizing means can also be manufactured integrally with the remainder of the pilot arrangement 23. In this case, the atomizing means also, for example, only has walls which are aligned at an angle of no more than 45° to the longitudinal axis L.

The proposed pilot arrangement 23 can have a particularly compact construction and can thus also be used in small nozzle devices 100, for example in what are referred to as three-flow fuel nozzles, in order to increase stability during operation.

LIST OF REFERENCE SIGNS

100 nozzle device
1 fuel feed
2 annular fuel reservoir
3 annular fuel line
4 fuel injector
5 outer and central air channel
6 swirling element
7 inner air channel
70 wall
71 outlet
8 central body
9 swirling arrangement
90 swirling element
10 air chamber
11 pilot fuel supply line
12 cavity
13 pilot fuel nozzle
130 pilot line
131 pilot fuel outlet
14 hollow chamber
15 weld
16 lance
17 base plate
18 support structure
19 opening
20 central body
21 support structures
22 environment
23 pilot arrangement
d thickness
D diameter
Dp external diameter
H height
h1 channel height
h2 thickness
h3 channel height
h4 thickness
L longitudinal axis

The invention claimed is:

1. A pilot arrangement for use in a nozzle device of a gas turbine arrangement, comprising:
   a pilot fuel nozzle,
   a central body arranged on a longitudinal axis,
   a cavity extending along the longitudinal axis for conducting fuel, a narrowest flow cross section of the cavity being configured to be larger than a flow cross section of the pilot fuel nozzle,
   the pilot fuel nozzle adjoining the cavity in a downstream direction and comprising a pilot line and a pilot fuel outlet arranged at a downstream end of the pilot line, a narrowest flow cross section of the pilot line being configured to be smaller than that of the cavity,
   the cavity being arranged in the central body,
   at least one swirling element being arranged in a circumferential manner around the central body, wherein the central body and the at least one swirling element form a swirling arrangement,
   the at least one swirling element, the central body and the pilot fuel nozzle being configured as a continuous, monolithic component,
   a hollow chamber arranged as a heat shield in a circumferential manner around the pilot fuel nozzle, and
   the hollow chamber being sealed in a flow-tight manner relative to an environment surrounding the pilot arrangement.

2. The pilot arrangement according to claim 1, and further comprising:
   at least one pilot fuel supply line configured for supplying fuel into the cavity, wherein the at least one pilot fuel supply line is guided through the at least one swirling element for conducting pilot fuel from a circumferential wall of an inner air channel radially inwards into the cavity.

3. The pilot arrangement according to claim 2, wherein at least one chosen from the flow cross section of the pilot line and a flow cross-section of the at least one pilot fuel supply line is configured to be at least one chosen from round and rhombic.

4. The pilot arrangement according to claim 1, wherein the hollow chamber is filled with an inert gas or evacuated.

5. The pilot arrangement according to claim 1, and further comprising, at a downstream end of the central body, a lance which extends on the longitudinal axis and in which the pilot line extends at least for a most part, wherein the lance comprising the pilot line has an axial length such that the fuel outlet is positioned at least in a downstream third or quarter.

6. The pilot arrangement according to claim 5, wherein the fuel outlet is positioned at least in a downstream third or quarter at least substantially at an outlet, of an inner air channel of the nozzle device.

7. The pilot arrangement according to claim 1, wherein all walls of the pilot arrangement are aligned at an angle of no more than 45° to the longitudinal axis.

8. The pilot arrangement according to claim 1, and further comprising an atomizer arranged within the fuel nozzle.

9. The pilot arrangement according to claim 8, wherein the atomizer includes a central body comprising support structures and is arranged in the pilot line.

10. A nozzle device comprising the pilot arrangement according to claim 1 and comprising an inner air channel, which is arranged on a central longitudinal axis of the nozzle device and within which the pilot arrangement is arranged coaxially with the inner air channel.

11. A gas turbine arrangement comprising a combustion chamber arrangement comprising at least one of the nozzle device according to claim 10 and a turbine arrangement.

12. The pilot arrangement according to claim 1, wherein the gas turbine arrangement is an aircraft engine.

13. The pilot arrangement according to claim 1, wherein the hollow chamber is arranged around at least one chosen from the pilot line and the cavity.

14. A method for producing a pilot arrangement comprising:
    providing a pilot arrangement for use in a nozzle device of a gas turbine arrangement, comprising:
        a pilot fuel nozzle,
        a central body arranged on a longitudinal axis,
        a cavity extending along the longitudinal axis for conducting fuel, a narrowest flow cross section of the cavity being configured to be larger than a flow cross section of the pilot fuel nozzle,
        the pilot fuel nozzle adjoining the cavity in a downstream direction and comprising a pilot line and a pilot fuel outlet arranged at a downstream end of the pilot line, a narrowest flow cross section of the pilot line being configured to be smaller than that of the cavity,
        the cavity being arranged in the central body,
        at least one swirling element being arranged in a circumferential manner around the central body, wherein the central body and the at least one swirling element form a swirling arrangement,
        the at least one swirling element, the central body and the pilot fuel nozzle being configured as a continuous, monolithic component,
        an atomizer arranged within the fuel nozzle,
    manufacturing the at least one swirling element, the central body and the pilot fuel nozzle as the continuous monolithic component using an additive manufacturing method.

15. A pilot arrangement for use in a nozzle device of a gas turbine arrangement, comprising:
    a pilot fuel nozzle,
    a central body arranged on a longitudinal axis,
    a cavity extending along the longitudinal axis for conducting fuel, a narrowest flow cross section of the cavity being configured to be larger than a flow cross section of the pilot fuel nozzle,
    the pilot fuel nozzle adjoining the cavity in a downstream direction and comprising a pilot line and a pilot fuel outlet arranged at a downstream end of the pilot line, a narrowest flow cross section of the pilot line being configured to be smaller than that of the cavity,
    the cavity being arranged in the central body,
    at least one swirling element being arranged in a circumferential manner around the central body, wherein the central body and the at least one swirling element form a swirling arrangement,
    the at least one swirling element, the central body and the pilot fuel nozzle being configured as a continuous, monolithic component:
    wherein all walls of the pilot arrangement are aligned at an angle of no more than 45° to the longitudinal axis.

* * * * *